(12) United States Patent
Ding et al.

(10) Patent No.: US 11,554,071 B2
(45) Date of Patent: Jan. 17, 2023

(54) ROBOTIC ASSISTANT AND METHOD FOR CONTROLLING THE SAME

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Houzhu Ding, San Gabriel, CA (US); Chengkun Zhang, Temple City, CA (US); Zhen Xiu, Chino Hills, CA (US); Huan Tan, Pasadena, CA (US)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 3 days.

(21) Appl. No.: 17/467,461

(22) Filed: Sep. 7, 2021

(65) Prior Publication Data

US 2022/0175609 A1 Jun. 9, 2022

Related U.S. Application Data

(63) Continuation-in-part of application No. 17/113,127, filed on Dec. 7, 2020, now Pat. No. 11,320,088.

(51) Int. Cl.
*F16M 11/00* (2006.01)
*A61H 3/04* (2006.01)
*G02B 27/01* (2006.01)

(52) U.S. Cl.
CPC ........... *A61H 3/04* (2013.01); *G02B 27/0179* (2013.01); *A61H 2003/043* (2013.01); *A61H 2201/0165* (2013.01); *A61H 2201/1635* (2013.01); *A61H 2201/5043* (2013.01); *G02B 2027/0187* (2013.01)

(58) Field of Classification Search
CPC ............... A61H 3/04; A61H 2003/043; A61H 2201/0165; A61H 2201/1635; A61H 2201/5043; A61H 2201/1659; A61H 2201/5007; A61H 2201/5066; A61H 2201/5092; G02B 27/0179; G02B 2027/0187; G02B 27/0093
See application file for complete search history.

(56) References Cited

U.S. PATENT DOCUMENTS

| | | | |
|---|---|---|---|
| 5,569,129 A * | 10/1996 | Seif-Naraghi | ... A63B 21/00181 482/69 |
| 2006/0031984 A1* | 2/2006 | Takizawa | ............. A61H 1/0266 5/86.1 |
| 2017/0001656 A1* | 1/2017 | Katayama | ................ A61H 3/04 |
| 2020/0281801 A1* | 9/2020 | Karlovich | .......... A63B 69/0064 |
| 2022/0047440 A1* | 2/2022 | Löcker | ..................... A61H 1/02 |

* cited by examiner

*Primary Examiner* — Amy J. Sterling

(57) ABSTRACT

A robotic assistant includes a base; an elevation mechanism positioned on the base; a display rotatably mounted on the elevation mechanism; a camera positioned on the display; and a control system that receives command instructions. In response to the command instructions, the control system is to detect movement of a face of the user in a vertical direction based on the images captured by the camera. In response to detection of the movement of the face of the user in the vertical direction, the control system is to rotate the display and actuate the elevation mechanism to the move the display up and down to allow the camera to face the face of the user during the movement of the face of the user in the vertical direction.

20 Claims, 18 Drawing Sheets

ROBOTIC ASSISTANT AND METHOD FOR CONTROLLING THE SAME

This application is a continuation-in-part of and claims priority to co-pending application Ser. No. 17/113,127, which was filed on Dec. 7, 2020. The application is incorporated by reference herein in its entirety.

TECHNICAL FIELD

The present disclosure generally relates to robots, and particularly to a smart robotic assistant that can provide walking assistance, walking training, and body training.

BACKGROUND

There are growing demands on robotics in the service sector for many years due to the age quake, silver society and man power shortage. As such, robotic assistants have attracted significant attention in recent years.

For example, one type of a robotic assistant can be designed to help support a portion of the user's bodyweight to reduce the load on the user's legs while walking, leading to reduced fatigue and less physical exertion. For example, plentiful studies on assistive robots can be found, including the applications for the upper limb, for the lower limb and for the assisting or training of the whole body.

These robotic assistants typically include wheels for movement and a vertical body having handles for users to grip. Some of the robotic assistants may include a display for displaying guidance information. However, because of the fixed nature of the vertical body and the display, these robotic assistants may suffer from lack of the ability of reconfiguring itself to adapt to different application scenarios.

Therefore, there is a need to provide a robotic assistant to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 4 is an enlarged view of a portion A of FIG. 3a.

FIG. 5 is an enlarged view of a portion B of FIG. 3a.

DETAILED DESCRIPTION

Figure 1:
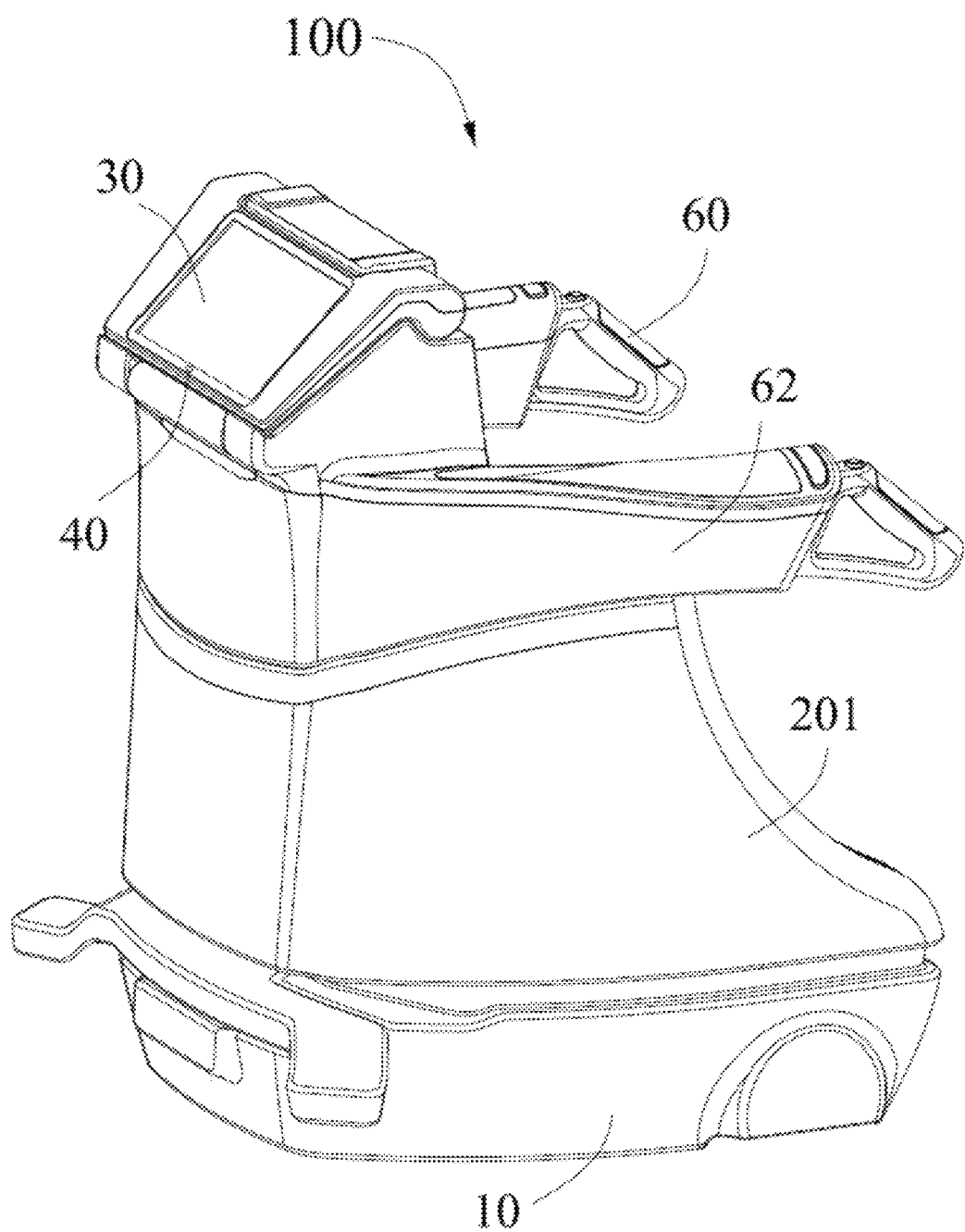
FIG. 1 is a schematic isometric view of a robotic assistant according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 shows an isometric view of a robotic assistant 100. In one embodiment, the robotic assistant 100 can be designed to help support a portion of a user's bodyweight to reduce the load on the user's legs when the user (e.g., a care seeker or a patient) is walking. The robotic assistant 100 can provide support/guide to people during their walking, so that they can maintain balance and walk safely. In one embodiment, the robotic assistant 100 may be employed in facilities, such as a healthcare facility, an elderly care facility, an assisted living facility, and the like, to assist senior people when they are walking. However, the robotic assistant 100 may be employed in other facilities. For example, the robotic assistant 100 may be employed in hospitals to provide walking assistance, body training, and fall prevention to people who temporarily lose their walking ability because of accidents or diseases.

Figure 2:
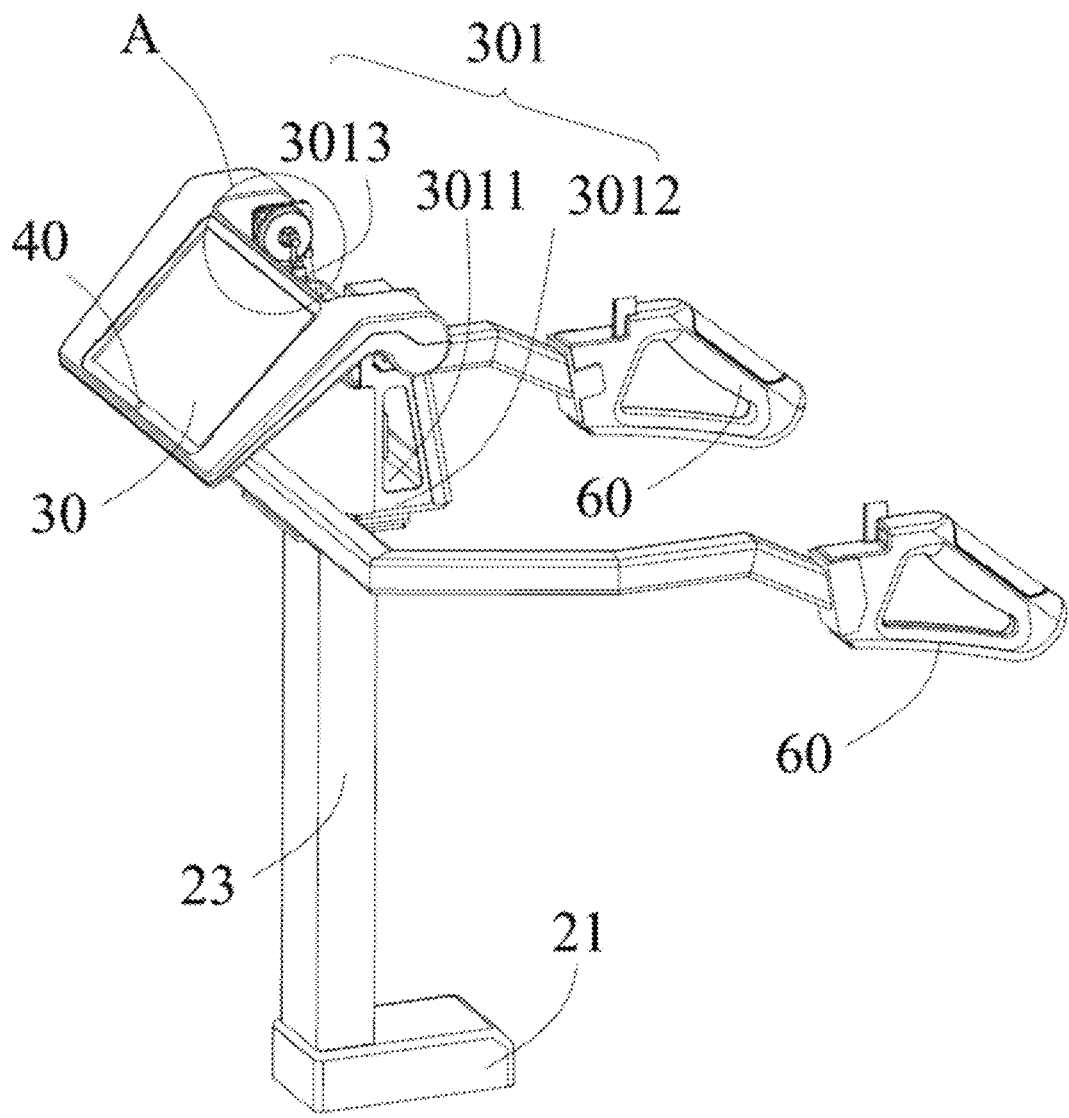
FIG. 2 is a schematic isometric view of the robotic assistant, with certain components omitted for clarity.
Figure 3A:
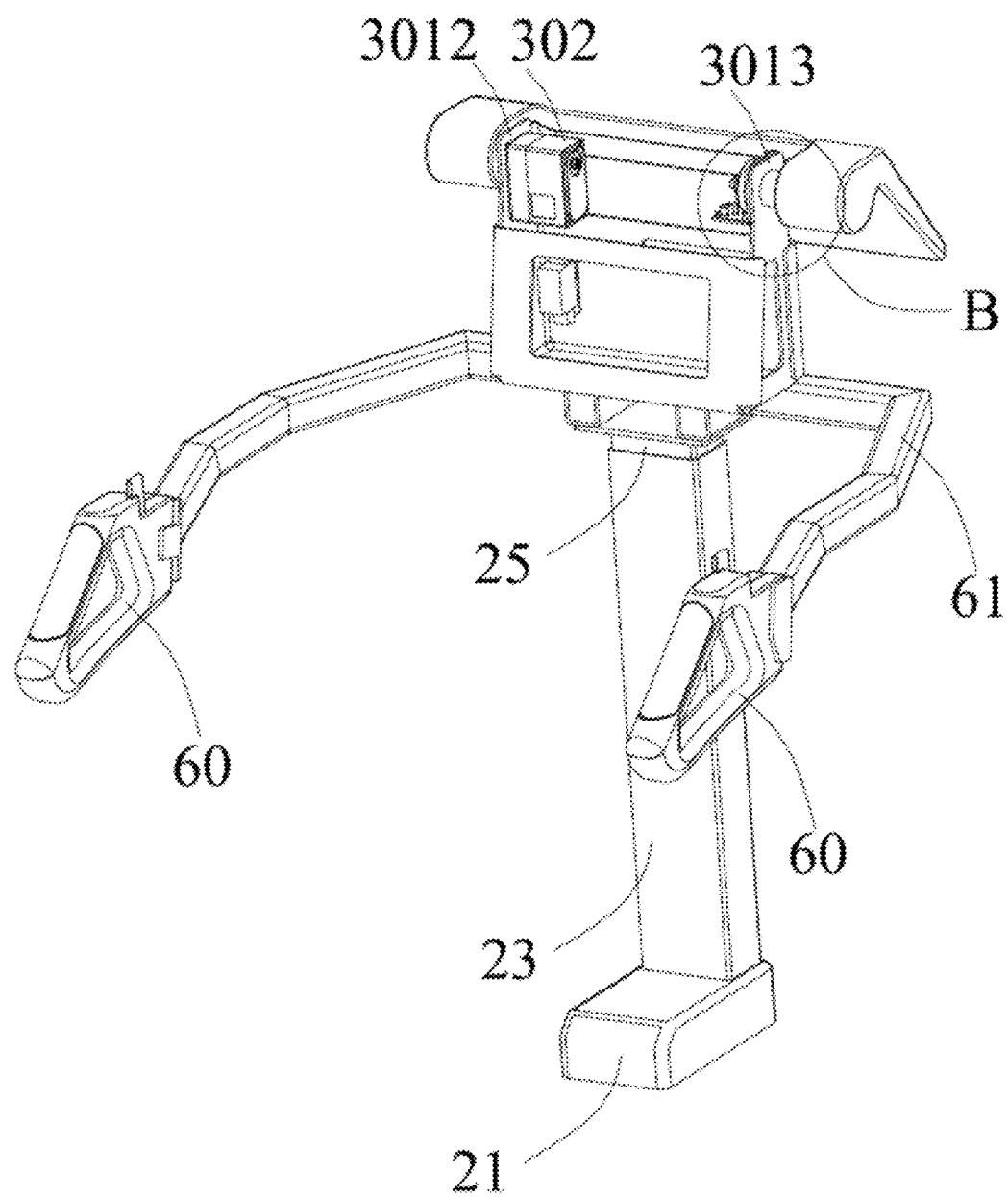
FIG. 3a is similar to FIG. 2, but viewed from a different perspective.
Figure 3B:
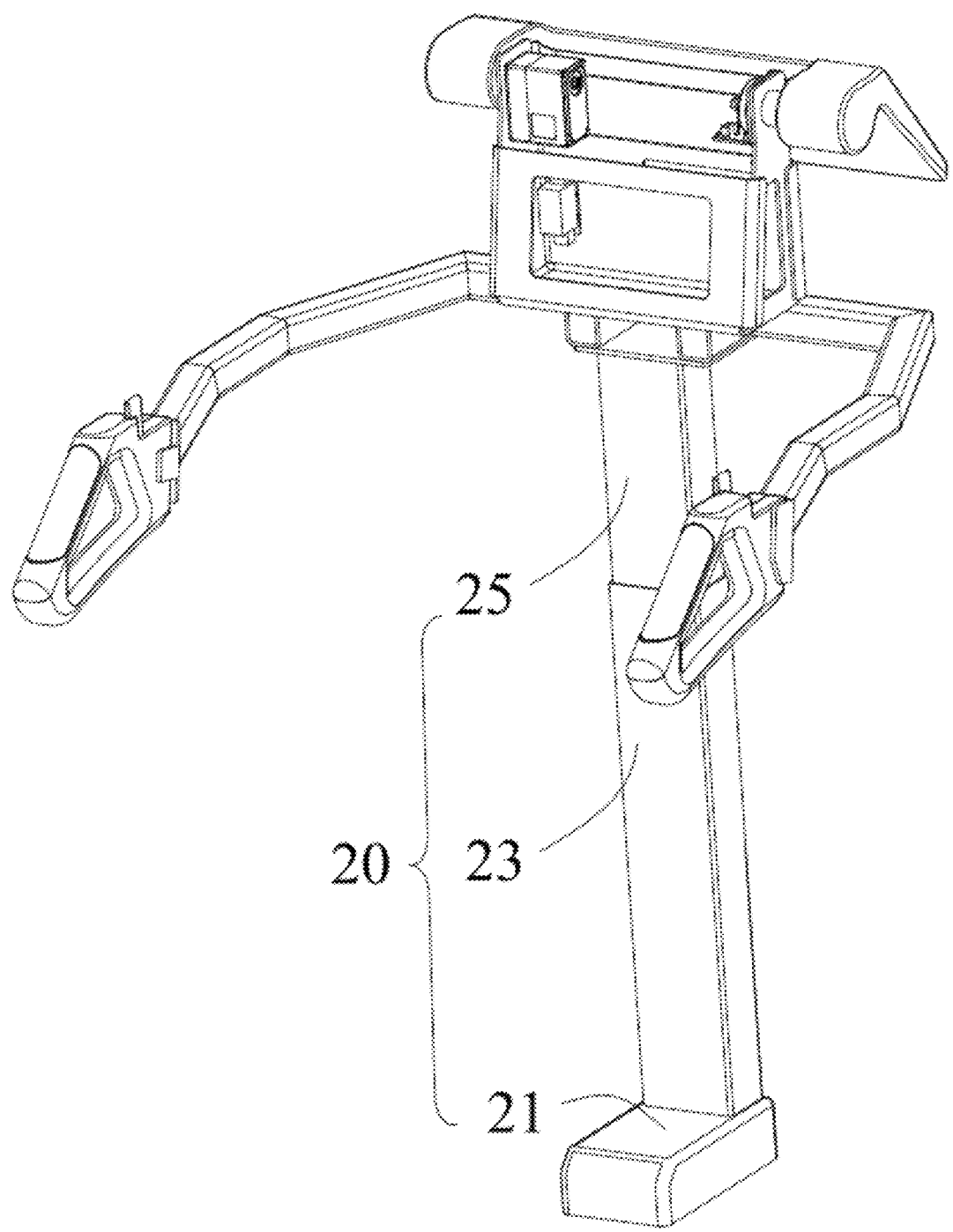
FIG. 3b is similar to FIG. 3, but showing a display in an extended position.

Referring to FIGS. 2, 3a, and 3b, in one embodiment, the robotic assistant 100 may include a base 10, an elevation mechanism 20 positioned on the base 10, a display 30 rotatably mounted on the elevation mechanism 20, a camera 40 positioned on the display 30, and a control system 50 (see FIG. 7) that receives command instructions from a host computer and a graphic user interface (GUI) displayed on a display 30 to allow users (e.g., healthcare professionals and care seekers) to directly control the robotic assistant 100. In response to the command instructions, the control system 50 controls movement of the elevation mechanism 20 and rotation of the display 30, and/or other mechanical or software aspects of the robotic assistant 100.

In one embodiment, the base 10 may provide a movement mechanism for the robotic assistant 100 to move from location to location. In one embodiment, the base 10 includes a body, two differentially driven wheel mechanisms, and one or more other wheels that are connected to the body. The wheel mechanisms allow for movement of the base 10 along a desired path, while the one or more other wheels allow for balance and stability of the base 10. The one or more other wheels may be castor wheels or omni-directional driving wheels.

In one embodiment, the elevation mechanism 20 is positioned on the top of the base 10. Via actuation of the elevation mechanism 20, the display 30 can move up and down in a vertical direction. When the display 30 is in a lowermost retracted position, the elevation mechanism 20 enables the robotic assistant 100 to have a limited height, which facilitates stability during movement and travel of the robotic assistant 100. The elevation mechanism 20 can be actuated to adjust the robotic assistant 100 to different heights so that the robotic assistant 100 can have the flexibility to adapt to users of different heights. Further description of the elevation mechanism 20 is provided below.

In one embodiment, the robotic assistant may include sensors that enable the robotic assistant 100 to perceive the environment where the robotic assistant 100 operates. In one embodiment, the sensors may include ranging sensors that require no physical contact with objects being detected. They allow the robotic assistant 100 to perceive an obstacle without actually having to come into contact with it. The ranging sensors may include infrared (IR) sensors, ultrasonic sensors, one or more light detection and ranging (LiDAR) sensors, near field communication (NFC), and RFID sensors/readers. In one embodiment, the sensors may include inertial measurement unit (IMU) sensors, each of which incorporates at least one accelerometer and at least one gyroscope. The one or more LiDAR sensors are used to create an environment map. In combination with the IMU sensors, the LiDAR sensors are used to determine a real-time position of the robotic assistant 100 in the environment map. Data from the ranging sensors are used to detect obstacles, such as bumps, over-hanging objects, spills, and other hazards during movement of the robotic assistant 100, and the robotic assistant 100 can alert the user to bypass the detected obstacles. These sensors can be positioned along the base 10 or other positions of the robotic assistant 100.

The control system 50 is electronically connected to the base 10, the elevation mechanism 20, and the sensors, and is configured to receive command instructions to control the robotic assistant 100. The command instructions can be received from the control system 50 in response to movement % action of the robotic assistant 100, or the control system 50 can receive command instructions from a host computer either wirelessly or through a wired connection, or through the GUI on the display 30. The control system 50 can also receive command instructions directly from a user. For example, the robotic assistant 100 can detect whether handles of the robotic assistant 100 are held by a user. In some modes, the control system 50 receives a command instruction after a user holds the handles. In response to the command instructions, the control system 50 controls movement of the base 10, and controls the elevation mechanism 20 to actuate vertical movement of the display 30. Further description of the control system 50 is provided below.

In one embodiment, the base 10 may be a differential drive platform. The base 10 may include two independently actuated wheel mechanisms and one castor wheel mechanisms. The two wheel mechanisms are spaced apart from each other and arranged at opposite sides of the base 10, with their rotation axes aligned with each other and extending along a widthwise direction of the base 10. The castor wheel mechanism can include an omni-directional wheel and is arranged adjacent to one end of the base 10 opposite the wheel mechanisms. It should be noted that the number and arrangement of the wheel mechanisms and castor wheel mechanism may change according to actual needs. For example, in an alternative embodiment, two wheel mechanisms and two castor wheel mechanisms may be respectively arranged at four corners of the base 10.

Referring to FIG. 3b, in one embodiment, the elevation mechanism 20 may include an actuator 21 mounted on the base 10, a main body 23 that is vertically positioned on the base 10, and a sliding member 25 slidably received in the main body 23. The actuator 21 is configured to drive the sliding member 25 to move up and down in the vertical direction. The display 30 is thus movable between a lowermost retracted position (see FIGS. 1-3a) and a determined, extended position (see FIG. 3b).

In another embodiment, the elevation mechanism 20 may include a lifting mechanism arranged within the main body 23 and the sliding member 25. The actuator 21 may be a linear motor and is configured to drive the lifting mechanism to elongate or retract in the vertical direction. The actuator 21 is configured to apply a pushing force or a pulling force to the lifting mechanism to drive the lifting mechanism to elongate or retract in the vertical direction, so as to drive the sliding member 25 to move up and down in the vertical direction. In one embodiment, the lifting mechanism may include a lead screw that is coupled to the output shaft of the motor, and a threaded collar that is coupled to and slidable along the lead screw. By engagement of the threaded collar with the lead screw, rotary motion from the actuator 21 is converted into translational motion. The elevation mechanism can then drive the display 30 to move up and down.

In yet another embodiment, the lifting mechanism may be a scissor lift mechanism. Specifically, the lifting mechanism may include one or more pairs of supports and that are rotatably connected to one another and each pair of supports and form a crisscross "X" pattern. The arrangement of these pairs of supports and is well known and will not be described in detail here. It should be noted that the lead screw and threaded collar, and the scissor lift mechanism are just examples of the lifting mechanism. The lifting mechanism may be of other configurations according to actual needs.

In one embodiment, the robotic assistant 100 may further include a first housing 201 (see FIG. 1) mounted on the top of the base 10. The elevation mechanism 30 is arranged within the first housing 201.

Referring to FIGS. 2 and 3a, in one embodiment, the robotic assistant 100 may further include a display holder 301 positioned on the top of the elevation mechanism 20 and a motor 302 fixed to the display holder 301. The display 30 is indirectly mounted on the elevation mechanism 20 through the display holder 301. The motor 302 is configured to drive the display 30 to rotate with respect to the display holder 301. In one embodiment, the display holder 301 is a hollow frame formed by a number of plates including a base plate 3011 and two vertical plates 3012 and 3013. The base plate 3011 is fixed to the top of the sliding member 25 of the elevation mechanism 20. The two vertical plates 3012 and 3013 are arranged at opposite sides of the base plate 3011. The display 30 is rotatably connected to the upper ends of the vertical plates 3012 and 3013. In one embodiment, the display 30 may define a U-shaped recess 31, and the upper ends of the two vertical plates 3012 and 3013 are received in the recess 31, and are rotatably connected to the inner side surfaces of the recess 31.

In one embodiment, the motor 302 is arranged between in the space between the vertical plates 3012 and 3013, and is fixed to the vertical plate 3012. In this case, the rotating motor shaft of the motor 302 passes through a hole defined in the vertical plate 3012, and is fixed to the display 30. The display 30 is thus able to rotate together with the motor shaft.

Figure 4:
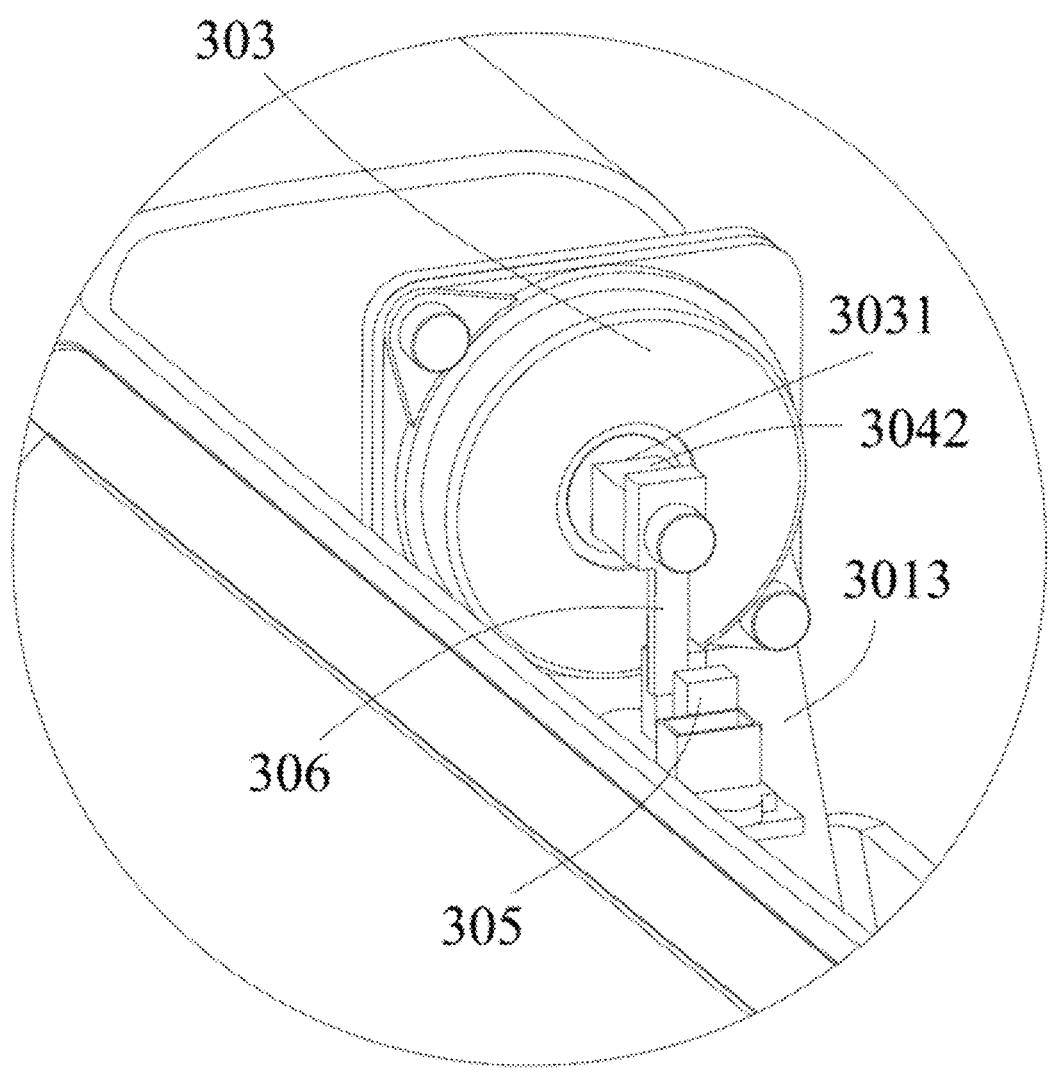
Figure 5:
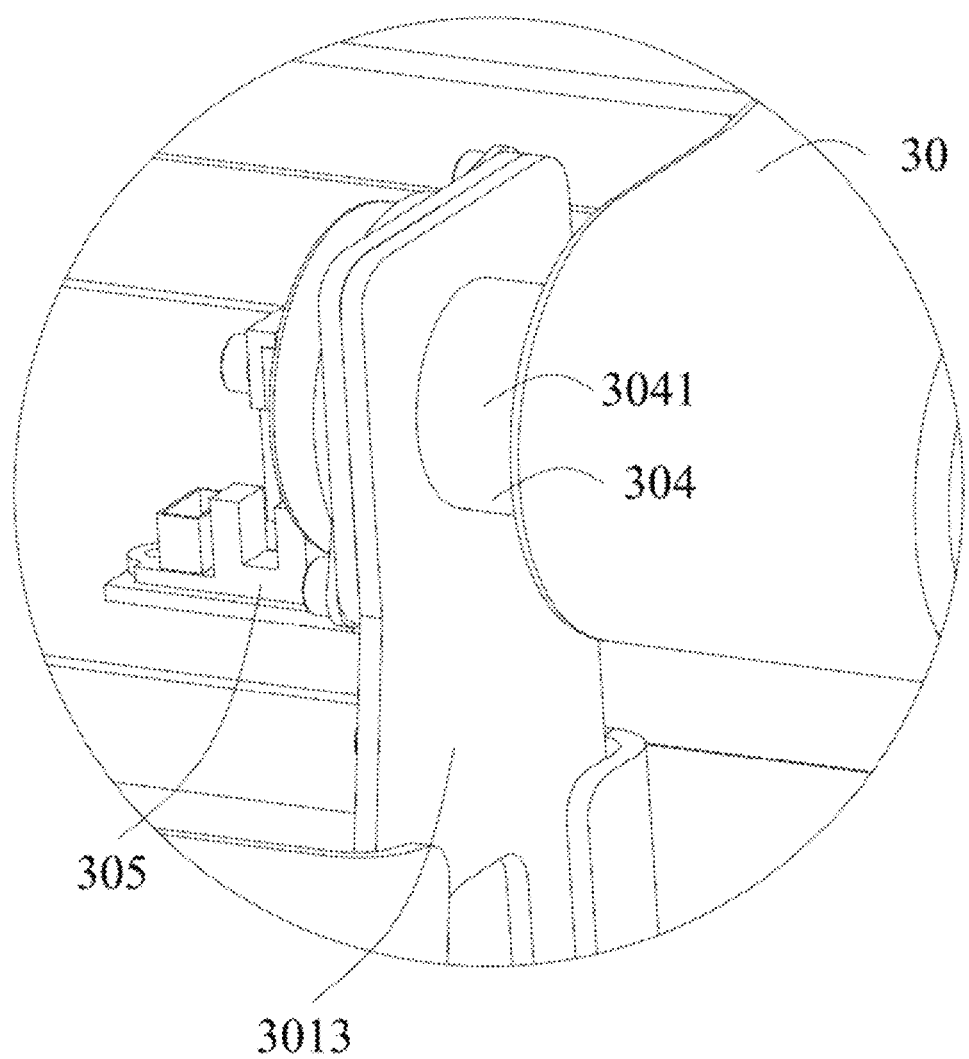

Referring to FIGS. 4 and 5, in one embodiment, the robotic assistant 100 may further include a rotary damper 303 coupled to the display holder 301. The rotary damper 303 is configured to control speed of rotation of the display 30. The rotary damper 303 is fixed to the vertical plate 3013. In one embodiment, the display 30 is connected to the vertical plate 3013 through a connecting member 304 and the rotary damper 303. The rotary damper 303 may define a through hole 3031. In one embodiment, the through hole 3031 is defined in a rotor of the rotary damper 303, and is a square hole. The connecting member 304 includes a main body 3041 and a shaft 3042. One end of the main body 3041 is fixed to the display 30, and the other opposite end is provided with the shaft 3042 that is sized and shaped according to the square through hole 3031 of the rotary damper 303. The main body 3041 passes through a through hole 3014 defined in the vertical plate 3013, and the shaft 3042 passes through the square through hole 3031 of the rotary damper 303. Rotation can thus be transmitted from the display 30 to the rotary damper 303. Specifically, when the connecting member 304 rotates together with the display 30, the rotor of the rotary damper 303 is thus driven to rotate. Various types of dampers are available. For example, the rotary damper 303 may utilize the principle of fluid resistance to dampen movement. In this example, the rotary damper 303 may include a main body, the rotor, a cap, and oil filled in the space defined by the main body, the rotor and the cap. The viscosity of the oil is used to provide the braking force to slow down the rotary motion of the display 30, which can ensure smooth and gentle rotation of the display 30. It should be noted that the damper 303 of FIG. 4 is merely an illustrative example and other types of dampers may be used for speed control of the display 30 according to actual needs.

Referring to FIG. 4, in one embodiment, the robotic assistant 100 may further include a limit switch 305 securely coupled to the display holder 301. The limit switch 305 is configured to be activated in response to the display 30 rotating to a predetermined position. The control system 50 is configured to stop rotation of the display 30 in response to the limit switch 305 being activated. In one embodiment, the limit switch 305 is an optical limit switch and is arranged adjacent to the rotary damper 303. A block 306 is fixed to the end of the shaft 3042 of the connecting member 304. The block 306 can thus rotate together with the display 30. The limit switch 305 may be an infrared slotted optical switch and may include an infrared source and a filtered infrared phototransistor detector that are mounted exactly opposite each other with a small, open gap between them. The limit switch 305 may detect the presence of an object in the gap that blocks the light. When the end of the block 306 moves into the gap of the limit switch 305, the limit switch 305 is activated, and the control system 50 then sends a signal to the motor 302 to stop rotation of the display 30. It should be noted that the limit switch 305 can be other types of switches, such as a mechanical type limit switch. In one embodiment, the predetermined position refers to an original position as shown in FIGS. 1 and 2. When the display 30 is in the original position, the end of the block 306 is received in the gap of the limit switch 305.

Referring back to FIGS. 2 and 3a, in one embodiment, the robotic assistant 100 may further include two handles 60 securely coupled to the elevation mechanism 20. The two handles 60 are configured to be fit into hands of a user to provide two hand grips. A user may hold the two handles 60 while walking/standing, which allows the robotic assistant 100 to provide an upward support force to the user, thereby helping the user to maintain balance during his/her walking/standing. In one embodiment, the two handles 60 are connected to the elevation mechanism 20 through a substantially U-shaped bar 61. The robotic assistant 100 may further include a second housing 62 (see FIG. 1) that is arranged above the first housing 201. The second housing 62 receives the U-shaped bar 61 therein and is fixed to the U-shaped bar 61.

In one embodiment, the display 30 may be a touch-sensitive display device and each provide an input interface and an output interface between the robotic assistant 100 and a user. The display 30 can display visual output to the user. The visual output may include graphics, text, icons, video, and any combination thereof. In one embodiment, when the display 30 is in the original position as shown in FIG. 1, the display 30 faces the front of the robotic assistant 100 to display general information, or allow telepresence of a user who is not actively using the walking function. When the display 30 rotates to a position to face backward, the display 30 can display walking/training related information.

Figure 6:
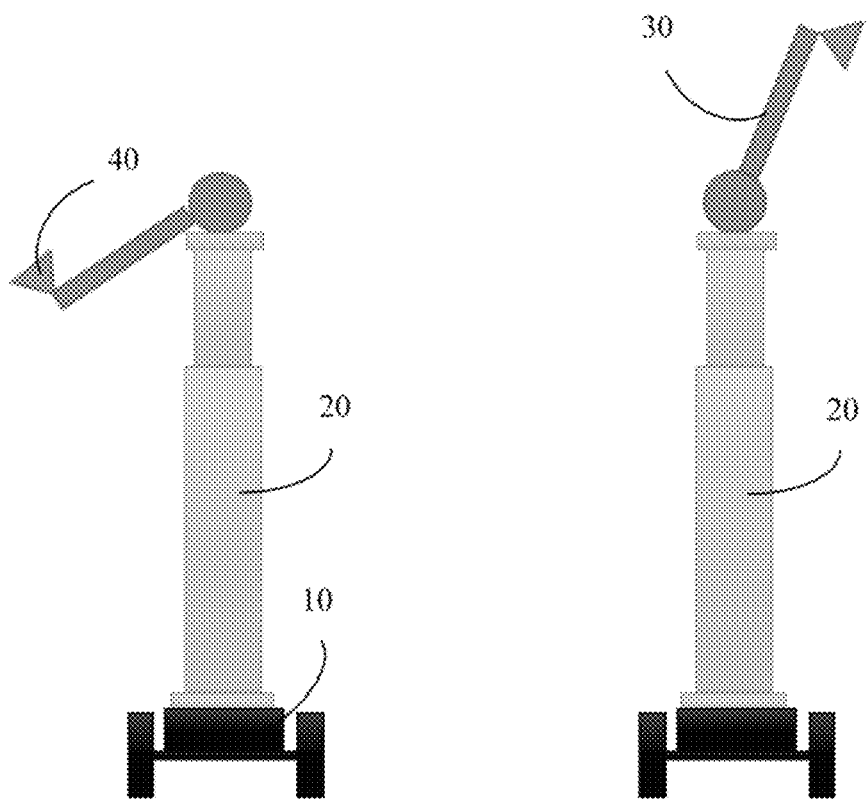
FIG. 6 is a schematic diagram showing the display in two different positions.

In one embodiment, the camera 40 may be an RGB camera and is arranged in the bezel of the display 30. As shown in FIG. 6, when the display 30 is in the original position, the camera 40 faces forward, and the camera 40 can rotate together with the display 30 to a desired position to face backward. The range of motion of the display 30/camera 40 can be set to 165 degrees. However, the range of motion of the display 30/camera 40 may change according to actual needs.

Figure 7:
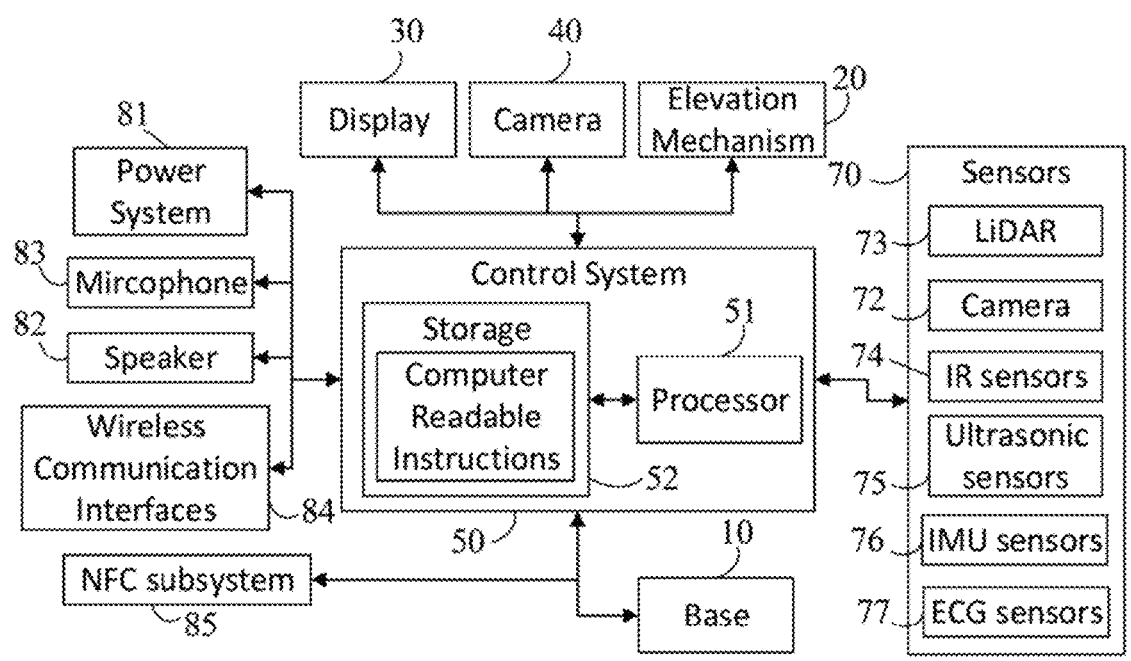
FIG. 7 is a schematic block diagram of the robotic assistant according to one embodiment.

Referring to FIG. 7, in one embodiment, the control system 50 may include a processor 51 and a storage 52 that stores computer readable instructions. The processor 51 runs or executes various software programs and/or sets of instructions stored in storage 52 to perform various functions for the robotic assistant 100 and to process data. The processor 51 may be a central processing unit (CPU), a general-purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general-purpose processor may be a microprocessor or any conventional processor or the like. The storage 52 may store software programs and/or sets of computer readable instructions and may include high-speed random-access memory and may include non-volatile memory, such as one or more magnetic disk storage devices, flash memory devices, or other non-volatile solid-state memory devices.

In one embodiment, the robotic assistant 100 may include a number of sensors 70 including a 3D camera 72, a LiDAR sensor 73, a number of IR sensors 74, a number of ultrasonic sensors 75, and a number of IMU sensors 76. The 3D camera 72 may be disposed on the first housing 201. The IR sensors 74 and the ultrasonic sensors 75 may be disposed on the first housing 201. The IMU sensors 76 may be disposed on the base 10. The sensors 72 to 76 are configured to output data to the control system 50 such that the control system 50 can perform localization, motion planning, trajectory tracking control and obstacle avoidance for the robotic assistant 100. In one embodiment, electrocardiogram (ECG) sensors 77 may be imbedded in the handles 60 to measure the heartbeat of the user holding the handles 60. It should be noted that the robotic assistant 100 may have more sensors than shown.

In one embodiment, the robotic assistant 100 further includes a power system 81 that powers all key components of the robotic assistant 100. The power system 81 is mounted on the base 10, and may include a battery management system (BMS), one or more power sources (e.g., battery, alternating current (AC)), a recharging system, a power failure detection circuit, a power converter or inverter, a power status indicator (e.g., a light-emitting diode (LED)) and any other components associated with the generation, management and distribution of electrical power. The power system 81 may further include a self-charging unit that can be engaged with a docking charging station in a fixed location, which allows the robotic assistant 100 to be charged. The battery management system manages a rechargeable battery, such as by protecting the battery from operating outside its safe operating area, monitoring its state, calculating secondary data, reporting that data, controlling its environment, authenticating it and/or balancing it.

In one embodiment, the robotic assistant 10 may further include a speaker 82 and a microphone 83 that provide an audio interface between a user and the robotic assistant 100. The microphone 83 receives audio data, converts the audio data to an electrical signal that is transmitted as a command to the control system 50. The speaker 82 converts the electrical signal to human-audible sound waves. The speaker 82 and the microphone 83 enable voice interaction between a user and the robotic assistant. The speaker 82 may play music or other audio contents to users for entertainment purpose. The robotic assistant 100 may further include wireless communication interfaces 84, such as WIFI and BLUETOOTH modules. The robotic assistant 100 may further include wireless communication interfaces 84, such as WIFI and BLUETOOTH modules. The robotic assistant 100 may further include an NFC subsystem 85 that may include an NFC chip and an antenna that communicates with another device/tag, which allows the NFC subsystem 85 to have an NFC reading function. The NFC subsystem 85 can be used for authorization purpose. That is, the NFC subsystem 85 can serve as a security mechanism to determine user privileges or access levels related to system resources.

It should be noted that FIG. 7 shows only one example of the robotic assistant 100, and that the robotic assistant 10) may have more or fewer components than shown, may combine two or more components, or may have a different configuration or arrangement of the components. For example, the robotic assistant 100 may include a front light band and a rear light band to illuminate the path for a user when the environment is dark. The robotic assistant 100 may include a storage unit for storing items such that the robotic assistant 100 can deliver the items to a desired location. The various components shown in FIG. 7 may be implemented in hardware, software or a combination of both hardware and software, including one or more signal processing and/or application specific integrated circuits.

Figure 8:
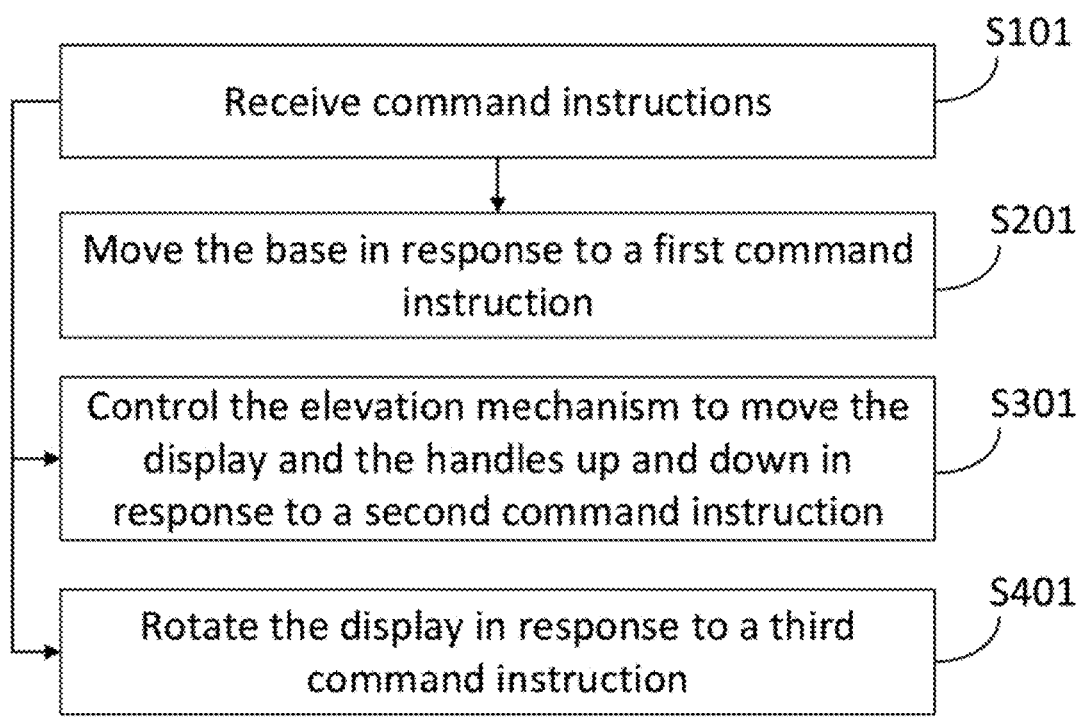
FIG. 8 is a schematic flowchart of a method for controlling the robotic assistant according to one embodiment.

FIG. 8 is a flowchart illustrating a method of controlling the robotic assistant 100 according to one embodiment, which includes the following steps. It should be noted that the order of the steps as shown in FIG. 8 is not limited and can change according to actual needs.

Step S101: Receive command instructions. The processor 51 of the control system 50 receives command instructions. For example, the processor 51 may receive a command instruction from a user (e.g., care seeker) that request the robotic assistant 100 to fetch an object from one location and deliver the object to another location.

Step S201: Move the base 10 in response to a first command instruction. The processor 51 may analyze each command instruction and move the base 10 to a determined location in response to a first command instruction. The first command instruction may include descriptions of locations where the robotic assistant 100 needs to reach. For example, when a user (e.g., care seeker) requests the robotic assistant 100 to fetch and deliver an object, the first command instruction may include descriptions of a starting location where the object is stored and a target location where the object needs to be delivered. The processor 51 may execute software programs and/or sets of instructions stored in storage 52 to perform localization, motion planning, and trajectory tracking such that the base 10 can determine its real-time position in a known map during movement along a planned path. If there is a dynamic obstacle on the planned path, the processor 51 can plan a new path to avoid the obstacle. In other words, the base 10 may be controlled to follow a prescribed path which will be adjusted if there are obstacles on the path. The base 10 can autonomously move first to the starting location and then to the target location. Additionally, the base 10 can be controlled with command on the screen or control inputs inferred from the handles, which could be attached with load cells. This allows a user to directly control movement of the base 10.

Step S301: Control the elevation mechanism 20 to move the display 30 and the handles 60 up and down in response to a second command instruction. The processor 51 may analyze each command instruction and control the elevation mechanism 20 to move the display 30 and the handles 60 up and down in response to the second command instruction. For example, the processor 51 may receive a command instruction from a user (e.g., care seeker) and control the robotic assistant 100 to move autonomously between determined positions. In this scenario, the processor 51 control the elevation mechanism 20 to move the display 30 and the handles 60 down to the lowermost retracted position (see FIG. 1) such that the robotic assistant 100 can have a limited height, which facilitates stability during movement and travel of the robotic assistant 100. The processor 51 may receive a command instruction from a user (e.g., care seeker) who requests the robotic assistant 100 to provide assistance when the user is walking, the processor 51 can then determine the height of the user and can move the display 30 and the handles 60 up to an extended position according to the height of the user. In this scenario, the extended position is not a fixed position and may change depending on the height of the user. With such configuration, the robotic assistant 100 can have the flexibility to adapt to different users of different height, which allows different users to walk and push the robotic assistant 100 in a substantially upright pose.

Step S401: Rotate the display 30 in response to a third command instruction. The processor 51 may analyze each command instruction and rotate the display 30 according to the third command instruction. For example, the processor 51 may receive a command instruction from a user (e.g., care seeker) and control the robotic assistant 100 to move autonomously between determined positions. In this scenario, the processor 51 rotates the display 30 to its original position as shown in FIG. 1 such that the camera 40 faces forward and can detect objects in front of the robotic assistant 100 such that the robotic assistant 100 can perceive the environment. The processor 51 may receive a command instruction from a user (e.g., care seeker) who requests the robotic assistant 100 to provide assistance when the user is walking, the processor 51 rotates the display 30 to a position where the camera 40 faces backward and can detect the facial expressions or other bio-characters of the user. As a result, the robotic assistant 100 can monitor the tiredness of the user.

In one embodiment, the robotic assistant 100 can operate in different modes. For example, the robotic assistant 100 can operate in a first mode or autonomous mode. In this mode, the control system 50 can perform localization, motion planning, trajectory tracking control and obstacle avoidance based on the data outputted by the sensors 72 to 76, which allows the robotic assistant 100 to move autonomously between a starting location and a target location so as to achieve an assigned task. The robotic assistant 100 can operate in a second mode or sleep mode. In this mode, robotic assistant 100 goes into a low power state and remains that way. When the robotic assistant 100 in the first mode receives no user input for a preset time period (e.g., 10 minutes) or the robotic assistant 100 is charged, the robotic assistant 100 is switched to the second mode. The robotic assistant 100 can be switched back to the first mode after receiving a command from the user, such as a voice command, a touch on the display 30, etc.

The robotic assistant 100 can operate in a third mode or standing assistive mode. In this mode, the robotic assistant 100 serves as a stable structure where the user can grab the handles 21 and stand up from a sitting position. After the robotic assistant 100 in the first mode approaches the user who is sitting, the robotic assistant 100 can be switched to the third mode. When there is no physical task, the robotic assistant 100 in the third mode can be switched to the first mode. The robotic assistant 100 can operate in a fourth mode or walking assistive mode. In this mode, the robotic assistant 100 is ready to be pushed by the user and helps support a portion of the bodyweight of the user when the user is walking. After the robotic assistant 100 in the first mode approaches the user who is standing, the robotic assistant 100 can be switched to the fourth mode. When there is no physical task, the robotic assistant 100 in the fourth mode can be switched to the first mode.

The robotic assistant 100 can operate in a fifth mode or training mode. In this mode, the robotic assistant 100 is ready to be pushed by the user and helps support a portion of the bodyweight of the user when the user is walking. After the robotic assistant 100 in the first mode approaches the user who is standing, the robotic assistant 100 can be switched to the fifth mode. When there is no physical task, the robotic assistant 100 in the fifth mode can be switched to the first mode. The difference between the training mode and the walking assistive mode is that the robotic assistant 100 in the training mode can exert extra resistance to the user so that he/she has to make extra efforts to push the robotic assistant forward or around, thus increasing the muscle strength and coordination capability given enough training sessions. In one embodiment, the base 10 may further include brakes. When the robotic assistant is switched to the training mode, the processor 51 controls the brakes to press against the moving wheels of the base 10 to create friction. In this case, the user needs to apply more pushing force to the robotic assistant 100, thereby increasing the muscle strength and coordination capability given enough training sessions. It should be noted that the robotic assistant 100 may have more working modes than discussed above.

Figure 9:
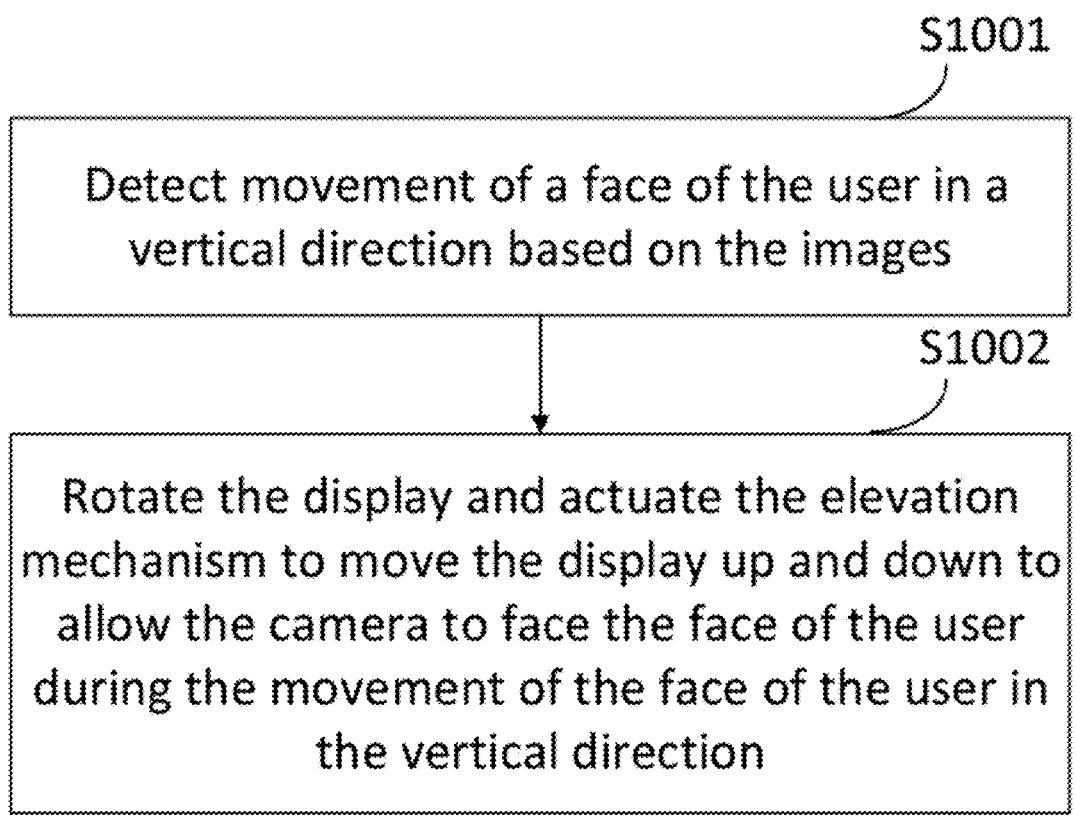
FIG. 9 is a schematic flowchart of a method for controlling the robotic assistant according to one embodiment.

In one embodiment, in the training mode, the robotic assistant 100 can provide assistance/guidance for a user doing squats. Here, squats mean a strength exercise in which the trainee lowers their hips from a standing position and then stands back up. FIG. 9 shows an exemplary flowchart of a method for controlling the robotic assistant when a user is doing squats. The method may include the following steps.

Step S1001: Detect movement of a face of the user in a vertical direction based on the images captured by the camera 40.

If a user desires to get assistance/guidance from the robotic assistant 100 when he/she is doing squats, he/she needs to stand near and at the back of the robotic assistant 100. After receiving a squat exercising command from a user, the processor 51 controls the display 30 to rotate such that the camera 40 can face backward to capture images of the environment behind the robotic assistant 100. In the course of the squat exercise of the user, the camera 40 is controlled to capture images of the environment behind the robotic assistant 100 at predetermined intervals. The processor 51 can detect the movement of the face of the user in the vertical direction based on the images of the environment behind the robotic assistant 100. The processor 51 may compare two or more of the images that are captured successively.

Figure 10:
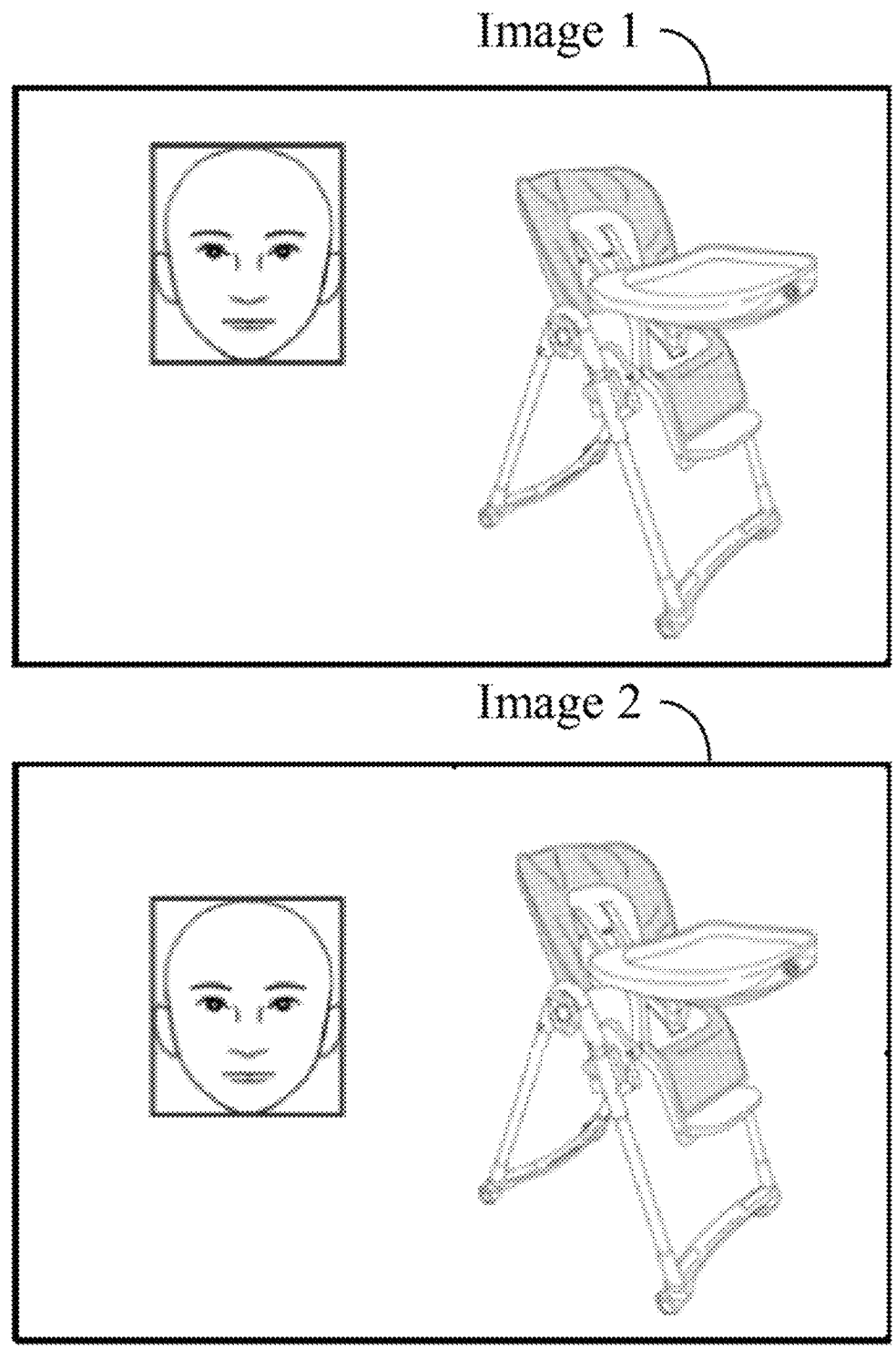
FIG. 10 shows two exemplary images that are successively captured by the camera of the robotic assistant according to one embodiment.

In one embodiment, the processor 51 compares two successively captured images. Specifically, image 1 in FIG. 10 represents a previously captured image, and image 2 represents a currently captured image. The processor 51 may recognize the face of the user in image 1 and image 2 and determine the positions of the face in image 1 and image 2. In one embodiment, the positions of the face refer to the centers of the bounding boxes for the face in image 1 and image 2. By comparing the positions of the face in image 1 and image 2, the processor 51 may determine that the face of the user is moving downward.

Step S1002: In response to detection of the movement of the face of the user in the vertical direction, rotate the display 30 and actuate the elevation mechanism 20 to the move the display 30 up and down to allow the camera 40 to face the face of the user during the movement of the face of the user in the vertical direction.

In one embodiment, the processor 51 controls the elevation mechanism 20 to move the display 30 down a predetermined distance when the face of the user moves downward, and controls the elevation mechanism 20 to move the display 30 up a predetermined distance when the face of the user moves upward. The processor 51 then rotates the display 30 until the camera 40 to face the face of the user. In this way, the camera 40 can keep facing the face of the user, which allows the face of the user to be constantly present in the middle of the display 30 for better display operation experience.

Figure 11:
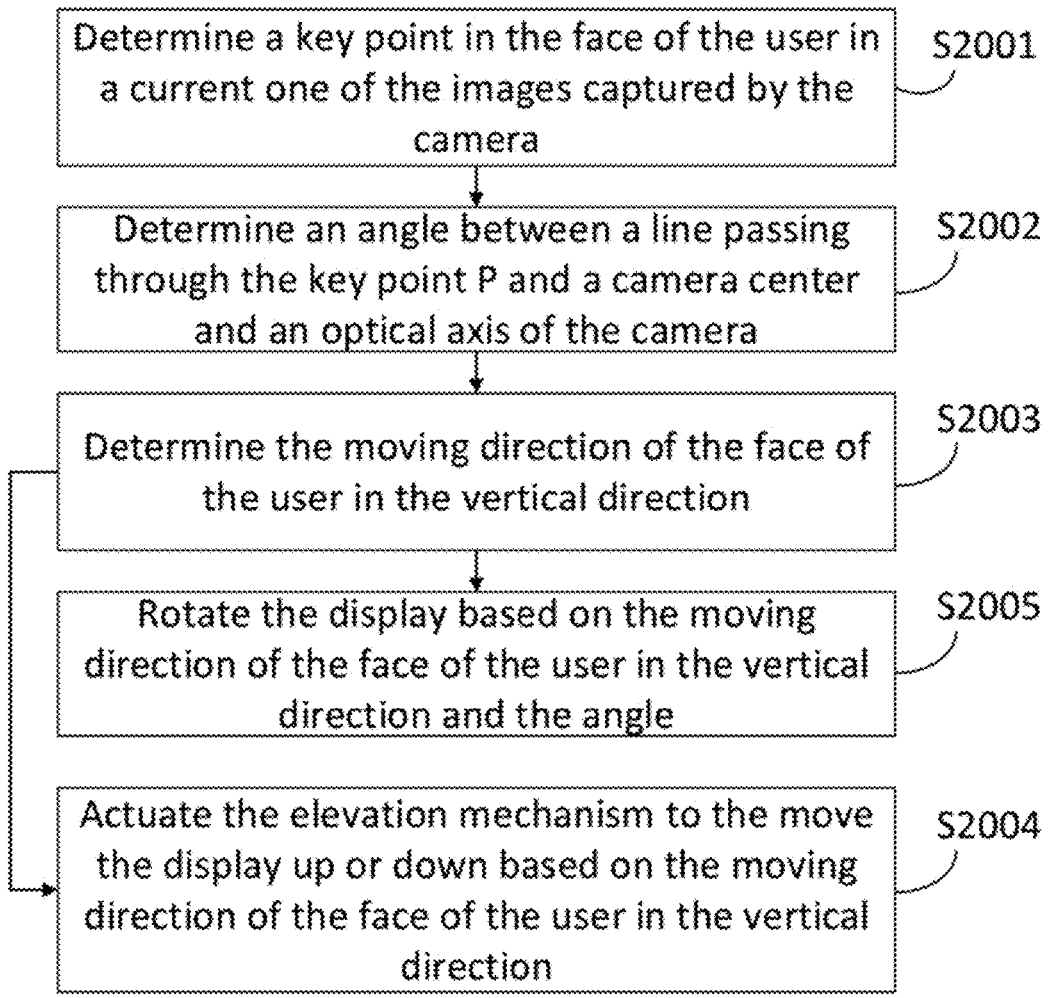
FIG. 11 is a schematic flowchart of a method for controlling the robotic assistant according to one embodiment.

Referring to FIG. 11, in one embodiment, rotating the display 30 may include the following steps. Step S2001: Determine a key point in the face of the user in a current one of the images captured by the camera 40.

Figure 12:
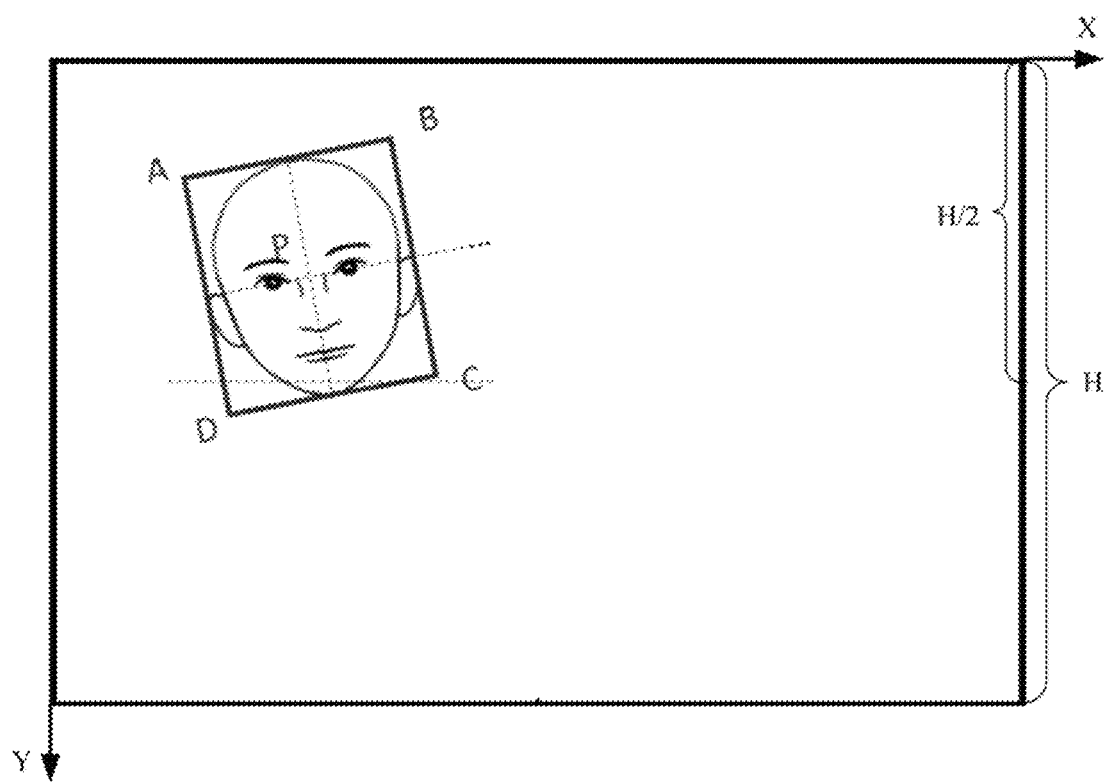
FIG. 12 shows an exemplary image that shows a key point of the face of a user according to one embodiment.

Referring to FIG. 12, in one embodiment, the key point may be the center between the eyes of the user, the center of the mouth of the user, the nose tip of the user, and the like. In the embodiment, the key point is the center P between the eyes of the user. The processor 51 may first determine the centers of the eyes of the user and then determine the middle point of the line segment that is formed by connecting the two centers of the eyes of the user. The middle point is then determined as the key point.

In one embodiment, points A, B, C, and D in FIG. 12 represent four vertices of the bounding box, and the position of the key point P can be calculated according to the following formulas:

$$P_x = \frac{A_x + B_x + C_x + D_x}{4} \text{ and } P_y = \frac{A_y + B_y + C_y + D_y}{4},$$

where $P_x$ represent the x-coordinate of the key point P, $A_x$, $B_x$, $C_x$, and $D_x$ represent the x-coordinates of the vertices A, B, C, and D, $P_y$ represent the y-coordinate of the key point P, $A_y$, $B_y$, $C_y$, and $D_y$ represent the y-coordinates of the vertices A, B, C, and D. In one embodiment, it is determined that the face of the user is in the middle of the display 30 when $$P_y = -\frac{H}{2},$$

where H represents the height of the image shown in FIG. 12. The coordinate system in FIG. 12 is defined as follows: the origin of the coordinate system is the upper left corner of the image, and x-axis and y-axis are along the width and height of the image respectively.

Step S2002: Determine an angle between a line passing through the key point P and a camera center and an optical axis of the camera 40.

Figure 13:
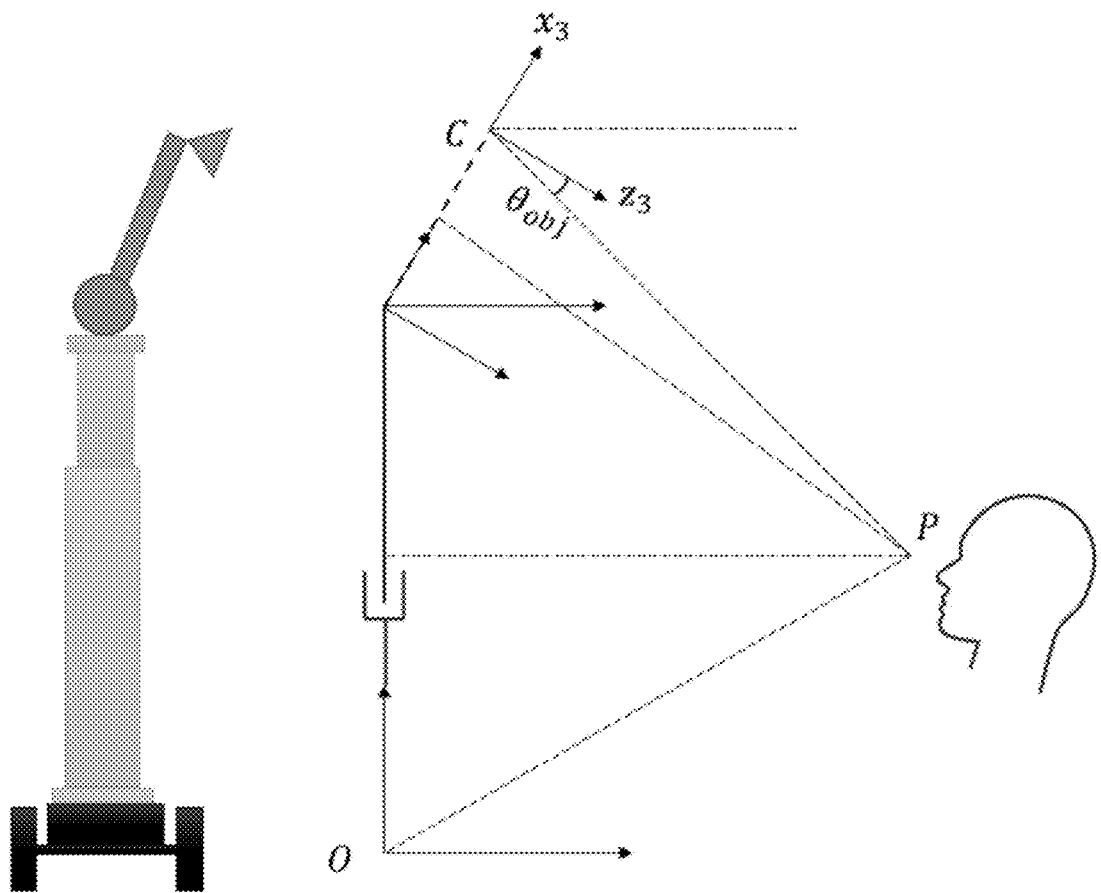
FIG. 13 is a schematic diagram of a simplified model of the robotic assistant according to one embodiment.
Figure 14A:
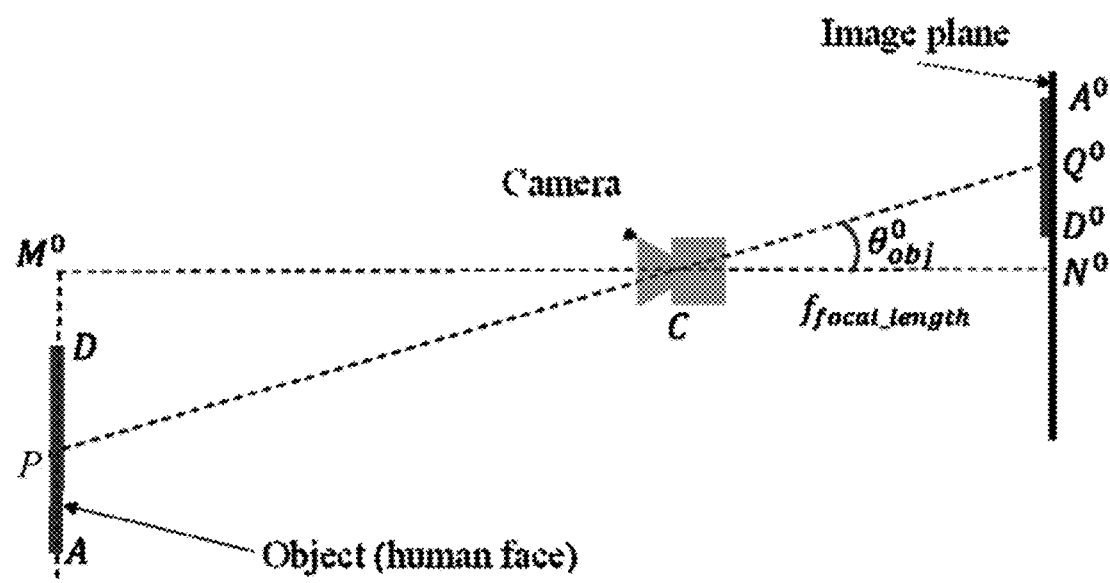
FIG. 14a is a diagram showing the relationship between the face of the user and the image of the face in an image plane when the user is standing at a predetermined location from a camera center.
Figure 14B:
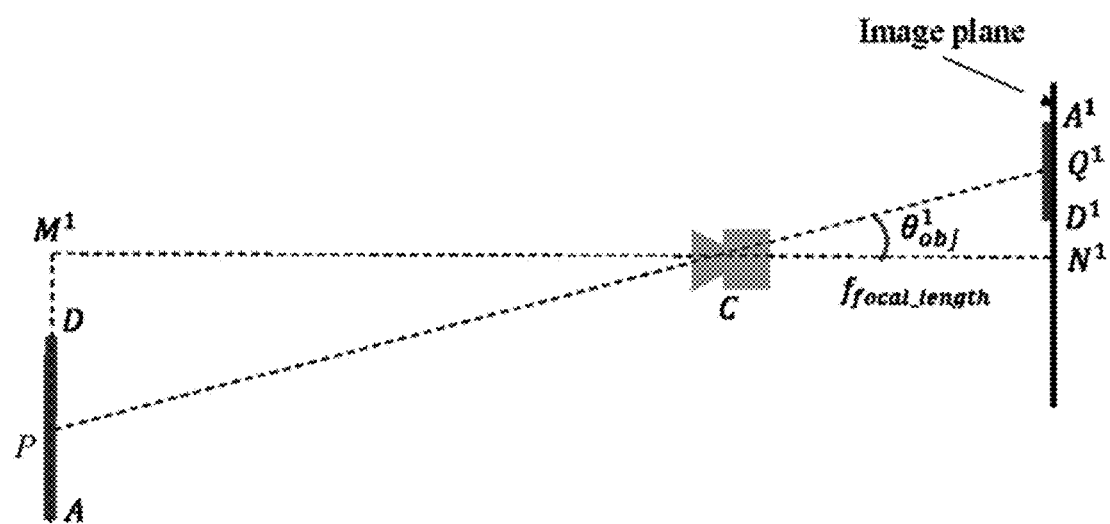
FIG. 14b is a diagram showing the relationship between the face of the user and the image of the face in the image plane when the user is standing at a random location.

FIG. 13 is a schematic diagram showing a simplified model of the robotic assistant 100 with the camera 40 facing backward. The simplified model of the robotic assistant 100 has a vertical translational degree of freedom (DOF) and a rotational degree of freedom. A coordinate system $x_3 y_3 z_3$ is built the camera center as an origin C, and the z-axis of the coordinate $x_3 y_3 z_3$ extends along the optical axis of the camera 40 which is the line from the focus, normal to the image plane. In one embodiment, the pinhole camera model is used to model the camera 40. As shown in FIGS. 14a and 14b, in this model, conceptually, all light passes through a vanishingly small pinhole placed and illuminates an image plane beneath it. The images formed on the image plane follow the laws of projective geometry. The pinhole of the pinhole camera model is defined as the "camera center" above. Thus, the angle $\theta_{obj}$ between the z-axis and the line segment CP in FIG. 13 is the angle between the line passing through the key point P and the camera center and the optical axis of the camera 40. The angle $\theta_{obj}$ can be also referred to as a pitch angle of the face of the user.

The principle for calculating the angle $\theta_{obj}$ is described as follows. FIG. 14a is a diagram showing the relationship between the face of the user and the image of the face of the user in the image plane when the user is standing at a predetermined location from the camera center C. FIG. 14b is a diagram showing the relationship between the face of the user and the image of the face of the user in the image plane when the user is standing at a random, current location. In FIGS. 14a and 14b, the face of the user is represented by a line segment AD that is perpendicular to the principal axis that passes through the camera center C and is perpendicular to the image plane. The projected points of the line segment AD onto the principal axis are represent by $M^0$ and $M^1$. The points $M^0$ and $M^1$ are mapped/projected into $N^0$ and $N^1$ in the image plane. The endpoints A and D are mapped/projected into $A^0$ and $D^0$ in the image plane in FIG. 14a, and are mapped/projected into $A^1$ and $D^1$ in the image plane in FIG. 14b. The key point P in FIGS. 14a and 14b is mapped/projected into $Q^0$ and $Q^1$ in the image plane in FIGS. 14a and 14b. According to triangle similarity theorems, $$\frac{M^0 C}{f_{focal\_length}} = \frac{AD}{A^0 D^0} \text{ and } \frac{M^1 C}{f_{focal\_length}} = \frac{AD}{A^1 D^1},$$

where $f_{focal\_length}$ represents the distance between the camera center and the image plane. According to the two equations, it can be obtained the following equation:

$$M^1 C = \frac{A^0 D^0}{A^1 D^1} M^0 C.$$

According to triangle similarity theorems, $$\frac{M^1 C}{f_{focal\_length}} = \frac{M^1 P}{N^1 Q^1}.$$

Since $$M^1 C = \frac{A^0 D^0}{A^1 D^1} M^0 C, \frac{M^1 C}{f_{focal\_length}} = \frac{M^1 P}{N^1 Q^1}, \text{ and } \theta^1_{obj} = \arctan\left(\frac{M^1 P}{M^1 C}\right),$$

it can be obtained the following equation:

$$\theta^1_{obj} = \arctan\left(\frac{AD \cdot N^1 Q^1}{A^0 D^0 \cdot M^0 C}\right).$$

AD and $M^0 C$ are can be measured in advance, $A^0 D^0$ are determined by counting the number of pixels between the points $A^0$ and $D^0$, $N^1 Q^1$ are determined by counting the number of pixels between the points $N^1$ and $Q^1$. In this way, the pitch angle $\theta^1_{obj}$ of the face of the user standing at the random, current location behind the robotic assistant 100 can thus be determined.

Step S2003: Determine the moving direction of the face of the user in the vertical direction. In one embodiment, the processor 51 may determine the moving direction of the face of the user in the vertical direction by comparing two or more of the images that are captured successively, which has been discussed in conjunction with FIG. 10.

Step S2004: Actuate the elevation mechanism to the move the display up or down based on the moving direction of the face of the user in the vertical direction. Specifically, the elevation mechanism 20 is controlled to move the display 30 down a predetermined distance when the face of the user moves downward, and is controlled to move the display 30 up a predetermined distance when the face of the user moves upward.

Step S2005: Rotate the display based on the moving direction of the face of the user in the vertical direction and the angle between a line passing through the key point P and a camera center and an optical axis of the camera 40. In the embodiment, the processor 51 rotates the display 30 while controlling the elevation mechanism 20 to move the display 30 up or down a predetermined distance until the camera 40 faces the face of the user.

Figure 15:
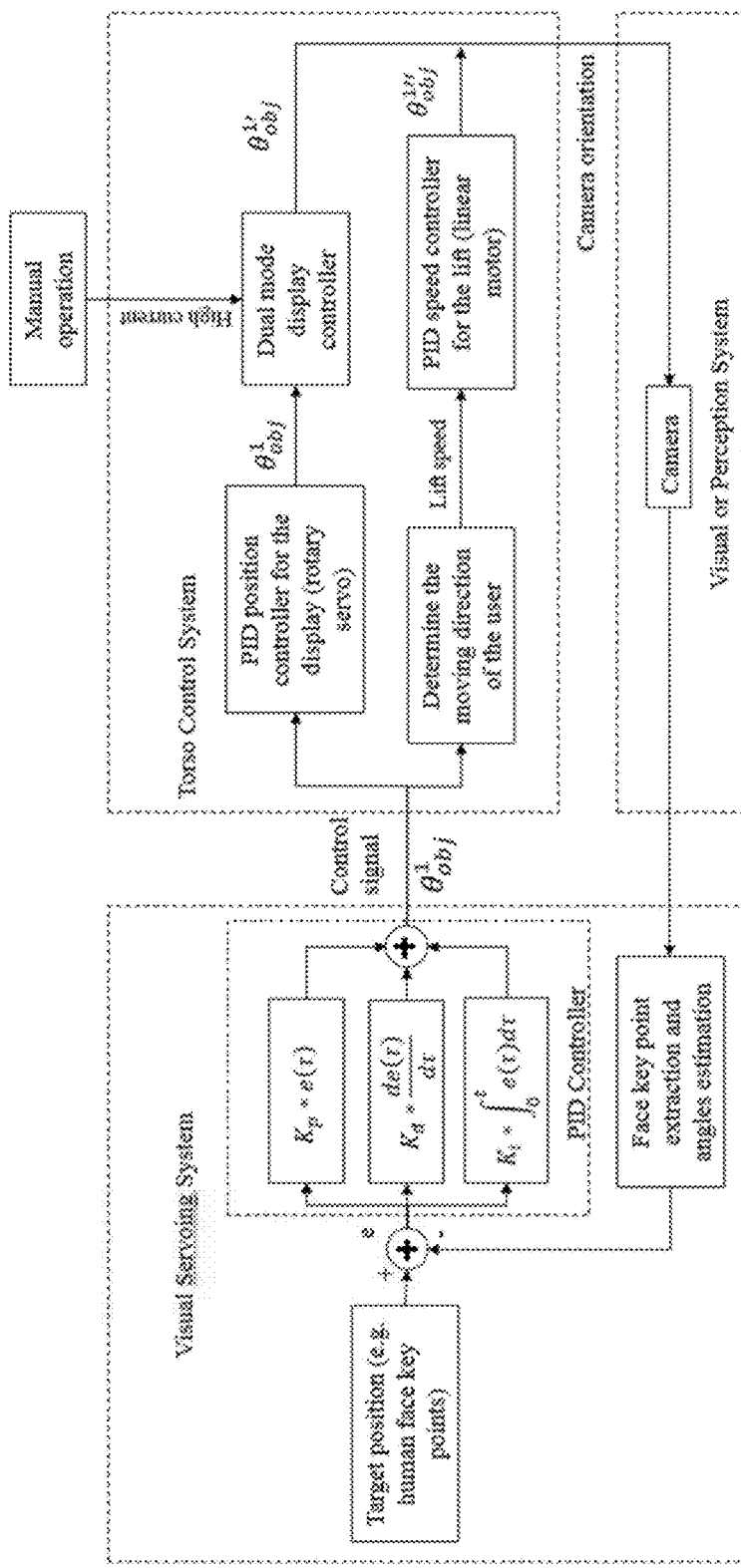
FIG. 15 is a schematic block diagram of the robotic assistant according to one embodiment.

Referring to FIG. 15, in one embodiment, the control system 50 may include a visual serving system that includes a proportional integral derivative (PID) controller. The PID controller may receive the difference between a target position of the key point P and a current position of the key point P. The target position here is the position where the key point P is in the middle of the display 30, that is, $$P_y = -\frac{H}{2}$$

(see FIG. 12). The PID controller may include a proportional controller that applies appropriate proportional changes for the difference between the target position of the key point P and the current position of the key point P. The PID controller may include an integral controller that examines the position of the key point P over time and offset of the target position of the key point P and then corrects the controller output if necessary. The PID controller may include a derivative controller that monitors the rate of change of the position of the key point P and accordingly changes the controller output when there are unusual changes.

The control system 50 may include a torso control system that receives the controller output from the PID controller of the visual serving system. The pitch angle $\theta^1_{obj}$ of the face of the user standing at the current location behind the robotic assistant 100 is also inputted into the torso control system. The torso control system may include a PID speed controller for controlling the elevation mechanism 20. After the moving direction of the face of the user is determined, the PID speed controller controls elevation mechanism 20 to move the display 30 up or down a determined distance which causes the pitch angle $\theta^1_{obj}$ to decrease by $\theta^{1''}_{obj}$. The torso control system may include PID position controller for controlling the display 30 to rotate to cause the pitch angle $\theta^1_{obj}$ to decrease by $\theta^{1'}_{obj}$. The $\theta^1_{obj}$ and $\theta^{1''}_{obj}$ satisfy the following equation: $\theta^{1'}_{obj} + \theta^{1''}_{obj} = \theta^1_{obj}$. Thus, after the display 30 is moved up or down a determined distance and has rotated for an angle of $\theta^{1'}_{obj}$, the pitch angle $\theta^1_{obj}$ is equal to zero, which means that the key point P has moved from the current location to the target location.

Figure 16:
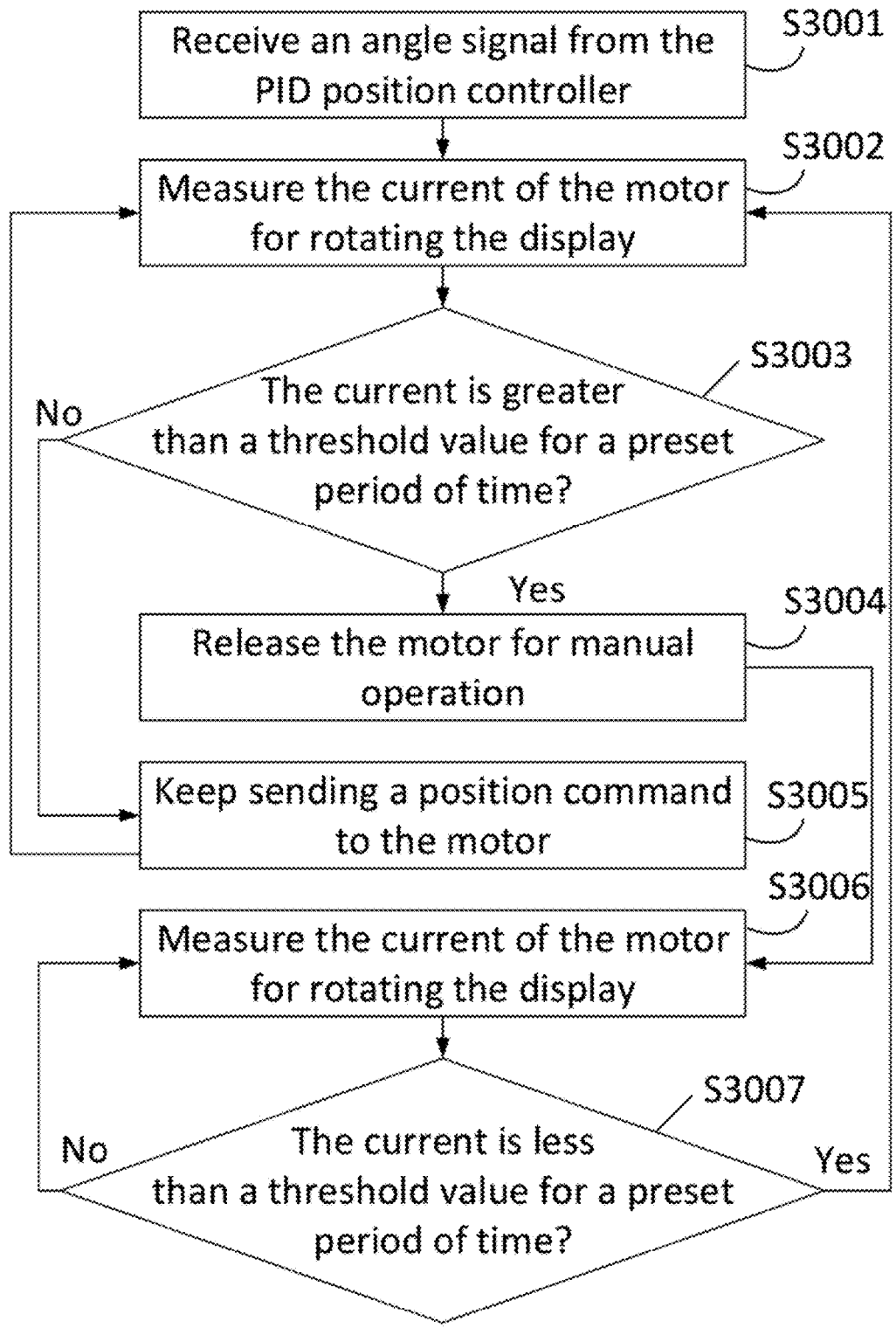
FIG. 16 is a flowchart of a method for controlling the display in an automatic control mode and in a manual control mode according to one embodiment.

The control system 50 may include a dual mode controller that may receive the output from the PID position controller to rotate the display 30. The dual mode controller may also release the motor 302 such that the display 30 can be manually rotated by a user. FIG. 16 is a flowchart of a method for controlling the display 30 in an automatic control mode and in a manual control mode. The method may include the following steps.

Step S3001: Receive an angle signal from the PID position controller.

The dual mode controller receives the angle signal from the PID position controller to rotate the display 30 by an angle of $\theta^{1'}_{obj}$.

Step S3002: Measure the current of the motor 302 for rotating the display 30.

When there is no external force applied on the display 30, the current of the motor 302 will be less than a minimum threshold value. When the user applies an external force to the display 30 to manually rotate the display 30, the current of the motor 302 will be greater than the maximum threshold value. By measuring and monitoring the current of the motor 302, it can determine whether the user has applied an external force to the display 30.

Step S3003: Determine whether the current is greater than a threshold value for a preset period of time.

For example, it is determined that the user has applied an external force to the display 30 if the current is greater than the maximum threshold value for 2 seconds. If so, the procedure goes to step S3004; otherwise, the procedure goes to step S3005.

Step S3004: Release the motor 302 for manual operation.

After the external force from the user is detected, the processor 51 will release the motor 302. For example, the motor 302 can be disengaged from the display 30, which frees the display 30 and allows the user to manually rotate the display 30.

Step S3005: Keep sending a position command to the motor 202.

If there is no external force applied on the display 30, the processor 51 will keep sending a position command to the motor 202 such that the display 30 can rotate to the desired position according to the angle signal from the PID position controller.

Step S3006: Measure the current of the motor 302 for rotating the display 30.

After the motor 302 is released, the current of the motor 302 will be measured and monitored such that whether the external force is still applied on the display 30 can be determined.

Step S3007: Determine whether the current is less than a threshold value for a preset period of time.

When the current is less than the minimum threshold value for a preset period of time (e.g., 2 seconds), it is determined that the external force applied on the display 30 has ceased; otherwise, it is determined that the external force is still applied on the display 30. If the current is less than the minimum threshold value for a preset period of time, the procedure goes back to step S3002. If the current is not less than the minimum threshold value for a preset period of time, the procedure goes back to step S3006.

The method shown in FIG. 16 allows the display 30 to be automatically rotated to a position where the camera 40 faces the face of the user, and allows the user to manually rotate the display 30 to a desired position. After the external force has ceased, the display 30 will be switched from the manual control mode to the automatic control mode.

It should be appreciated the above disclosure detailed several embodiments of the robotic assistant 100 that can provide walking assistance and fall prevention. As mentioned above, the robotic assistant 100 can be employed in assisted living facilities or healthcare facilities. However, the disclosure is not limited thereto. In other exemplary usage scenarios, the robotic assistant 100 may be used in hospitals. With the configuration described above, the robotic assistant can promote an active living life style for the elderly people. The robotic assistant can allow them to do more exercise to maintain their mobility capability. Moving around also provide more chances for the elderly people to interact with other people (particularly in the elderly care facility or assistive living facility) so that they feel less isolated. When a user doing squats stands properly at the back of the robotic assistant, the camera can be controlled to constantly face the face of the user, which allows the face of the user to be present in the center of the display. The robotic assistant can provide guidance/assistance by display information on the display, such as number of squats.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A robotic assistant, comprising:
   a base;
   an elevation mechanism positioned on the base;
   a display rotatably mounted on the elevation mechanism;
   a camera positioned on the display, the camera configured to capture images of a user; and
   a control system that receives command instructions;
   wherein in response to the command instructions, the control system is configured to detect movement of a face of the user in a vertical direction based on the images;
   wherein in response to detection of the movement of the face of the user in the vertical direction, the control system is configured to rotate the display and actuate the elevation mechanism to the move the display up and down to allow the camera to face the face of the user during the movement of the face of the user in the vertical direction.

2. The robotic assistant of claim 1, further comprising a display holder positioned on a top of the elevation mechanism and a motor fixed to the display holder, wherein the display is indirectly mounted on the elevation mechanism through the display holder, and the motor is configured to drive the display to rotate with respect to the display holder.

3. The robotic assistant of claim 2, further comprising a rotary damper coupled to the display holder, wherein the rotary damper is configured to control speed of rotation of the display.

4. The robotic assistant of claim 1, further comprising two handles securely coupled to the elevation mechanism, wherein the two handles are configured to be fit into hands of the user to provide two hand grips.

5. The robotic assistant of claim 2, further comprising a limit switch securely coupled to the display holder, wherein the limit switch is configured to be activated in response to the display rotating to a predetermined position, and the control system is configured to stop rotation of the display in response to the limit switch being activated.

6. The robotic assistant of claim 1, wherein the elevation mechanism comprises an actuator mounted on the base, a main body that is vertically positioned on the base, and a sliding member slidably connected to the main body, the display is positioned on the sliding member, and the actuator is configured to drive the sliding member to move up and down.

7. A robotic assistant, comprising:
   a base;
   an elevation mechanism disposed in a vertical direction and mounted on the base;
   a display rotatably coupled to the elevation mechanism;
   a camera fixed to the display, the camera configured to capture images of a user;
   one or more processors;
   a memory; and
   one or mere programs, wherein the one or more programs are stored in the memory and configured to be executed by the one or more processors, the one or more programs comprises:
   instructions for detecting movement of a face of the user in a vertical direction based on the images; and
   instructions for, in response to detection of the movement of the face of the user in the vertical direction, rotating the display and actuating the elevation mechanism to the move the display up and down to allow the camera to face the face of the user during the movement of the face of the user in the vertical direction.

8. The robotic assistant of claim 7, further comprising a display holder positioned on a top of the elevation mechanism and a motor fixed to the display holder, wherein the display is indirectly mounted on the elevation mechanism through the display holder, and the motor is configured to drive the display to rotate with respect to the display holder.

9. The robotic assistant of claim 8, further comprising a rotary damper coupled to the display holder, wherein the rotary damper is configured to control speed of rotation of the display.

10. The robotic assistant of claim 7, further comprising two handles securely coupled to the elevation mechanism, wherein the two handles are configured to be fit into hands of the user to provide two hand grips.

11. The robotic assistant of claim 8, further comprising a limit switch securely coupled to the display holder, wherein the limit switch is configured to be activated in response to the display rotating to a predetermined position, and the control system is configured to stop rotation of the display in response to the limit switch being activated.

12. The robotic assistant of claim 7, wherein the elevation mechanism comprises an actuator mounted on the base, a main body that is vertically positioned on the base, and a sliding member slidably connected to the main body, the display is positioned on the sliding member, and the actuator is configured to drive the sliding member to move up and down.

13. A method for controlling a robotic assistant, the method comprising:
   providing a base;
   providing an elevation mechanism positioned on the base;
   providing a display rotatably coupled to the elevation mechanism;
   providing a camera fixed to the display;
   obtaining a plurality of images of a user using the camera;
   detecting movement of a face of the user in a vertical direction based on the images;
   in response to detection of the movement of the face of the user in the vertical direction, rotating the display and actuating the elevation mechanism to the move the display up and down to allow the camera to face the face of the user during the movement of the face of the user in the vertical direction.

14. The method of claim 13, wherein rotating the display comprises:
   determining a key point in the face of the user in a current one of the images;
   determining an angle between a fine passing through the key point and a camera center and an optical axis of the camera;
   determining moving direction of the face of the user in the vertical direction; and
   rotating the display based on the moving direction of the face of the user in the vertical direction and the angle.

15. The method of claim 14, wherein actuating the elevation mechanism to the move the display up and down comprises, after determining moving direction of the face of the user in the vertical direction, actuating the elevation mechanism to the move the display up or down based on the moving direction of the face of the user in the vertical direction.

16. The method of claim 13, further comprising providing a display holder positioned on a top of the elevation mechanism and a motor fixed to the display holder, wherein the display is indirectly mounted on the elevation mechanism through the display holder, and the motor is configured to drive the display to rotate with respect to the display holder.

17. The method of claim 16, further comprising providing a rotary damper coupled to the display holder, wherein the rotary damper is configured to control speed of rotation of the display.

18. The method of claim 13, further comprising providing two handles securely coupled to the elevation mechanism, wherein the two handles are configured to be fit into hands of the user to provide two hand grips.

19. The method of claim 16, further comprising providing a limit switch securely coupled to the display holder, wherein the limit switch is configured to be activated in response to the display rotating to a predetermined position, and the control system is configured to stop rotation of the display in response to the limit switch being activated.

20. The method of claim 13, wherein the elevation mechanism comprises an actuator mounted on the base, a main body that is vertically positioned on the base, and a sliding member slidably connected to the main body, the display is positioned on the sliding member, and the actuator is configured to drive the sliding member to move up and down.

* * * * *